United States Patent
Greenberg et al.

[11] Patent Number: 5,977,994
[45] Date of Patent: Nov. 2, 1999

[54] DATA RESAMPLER FOR DATA PROCESSING SYSTEM FOR LOGICALLY ADJACENT DATA SAMPLES

[75] Inventors: Michael P. Greenberg, Goffstown; Michael J. Wilt, Windham, both of N.H.

[73] Assignee: Acuity Imaging, LLC, Nashua, N.H.

[21] Appl. No.: 09/025,938

[22] Filed: Feb. 19, 1998

Related U.S. Application Data

[63] Continuation-in-part of application No. 08/953,772, Oct. 17, 1997.

[51] Int. Cl.$^6$ ................................................. G06F 13/00
[52] U.S. Cl. ........................ 345/508; 345/501; 345/523; 345/441
[58] Field of Search ..................... 345/418, 428, 345/429, 437–439, 441–443, 501–504, 520, 521, 523, 507, 509, 513, 508

[56] References Cited

U.S. PATENT DOCUMENTS

| | | | |
|---|---|---|---|
| 5,341,468 | 8/1994 | Shiraishi et al. | 345/432 |
| 5,384,912 | 1/1995 | Ogrinc et al. | 345/523 |
| 5,444,834 | 8/1995 | Kai | 345/434 |
| 5,511,154 | 4/1996 | Johnson, Jr. et al. | 345/422 |
| 5,717,440 | 2/1998 | Katsura et al. | 345/513 |
| 5,784,047 | 7/1998 | Cahill, III et al. | 345/127 |
| 5,835,160 | 11/1998 | Chen et al. | 348/581 |

*Primary Examiner*—U. Chauhan
*Attorney, Agent, or Firm*—Bourque & Associates PA

[57] ABSTRACT

A data resampler for a data processing system for logically adjacent data samples is provided. The data resampler includes a memory subsystem for storing samples to be rendered, a digital differential analyzer (DDA) for generating an interpolation corner address for a sample to be rendered and which also generates a set of interpolation fractions. The resampler also includes a fetch unit, which receives the generated interpolation corner address and generates four source addresses of samples to be fetched from the memory subsystem. A number of memory units are included in the resampler. The first memory unit is a first in, first out FIFO memory, for holding the generated interpolation fractions and for permitting the DDA and fetch unit to continue to operate during memory read latency periods. The second memory unit is also a FIFO memory and is used to hold pixel data. The resampler further includes an interpolation unit, which receives pixel data from the second FIFO memory unit and interpolation fractions from the first FIFO memory unit. The interpolation unit then computes rendered result pixels, assembles the result pixels into memory words and outputs the words to a destination memory address, which is supplied by an address generator in a destination memory subsystem via a third FIFO memory unit.

24 Claims, 6 Drawing Sheets

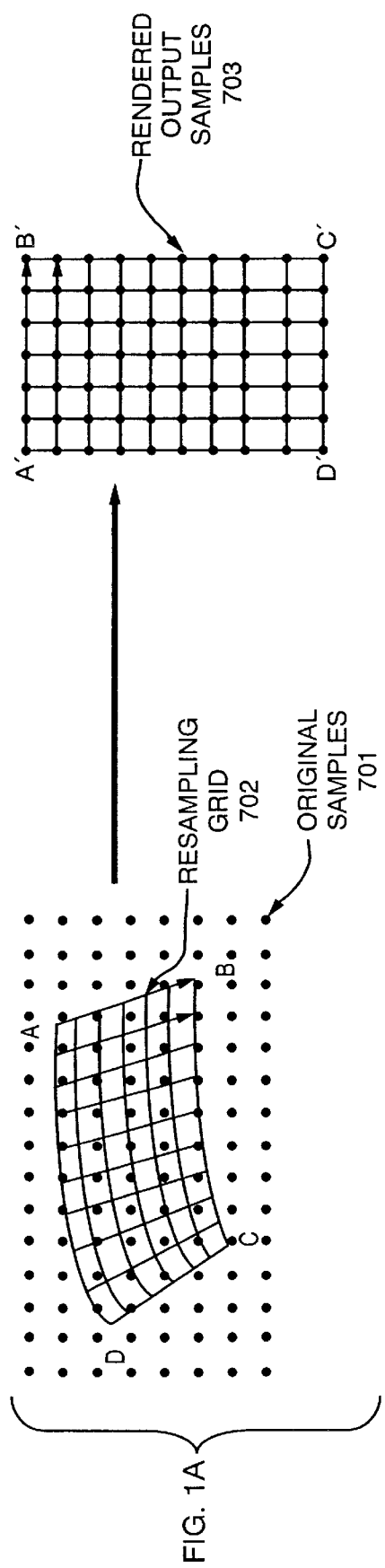
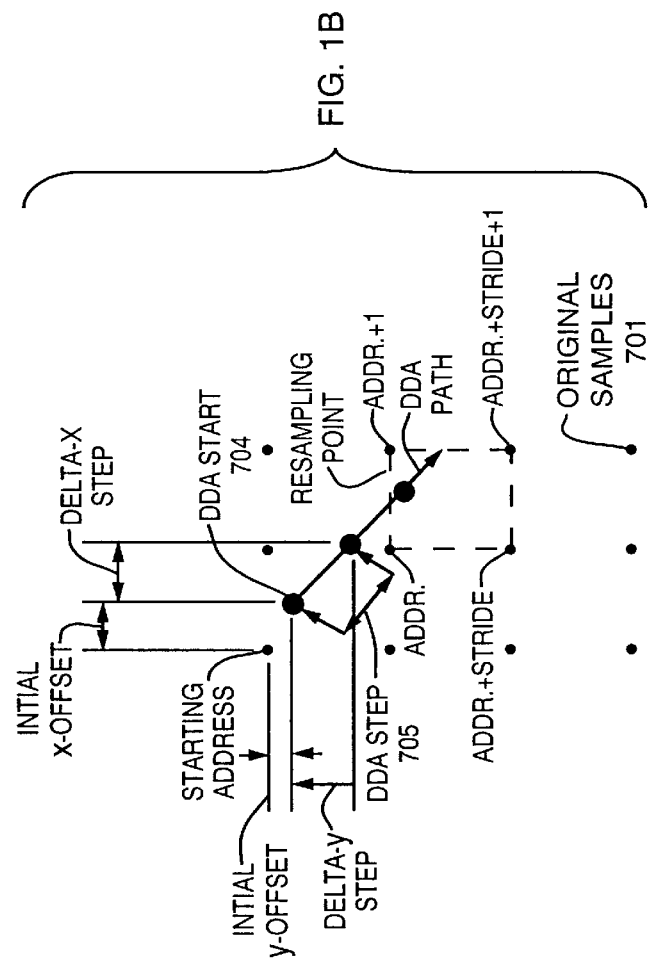
FIG. 1A
FIG. 1B

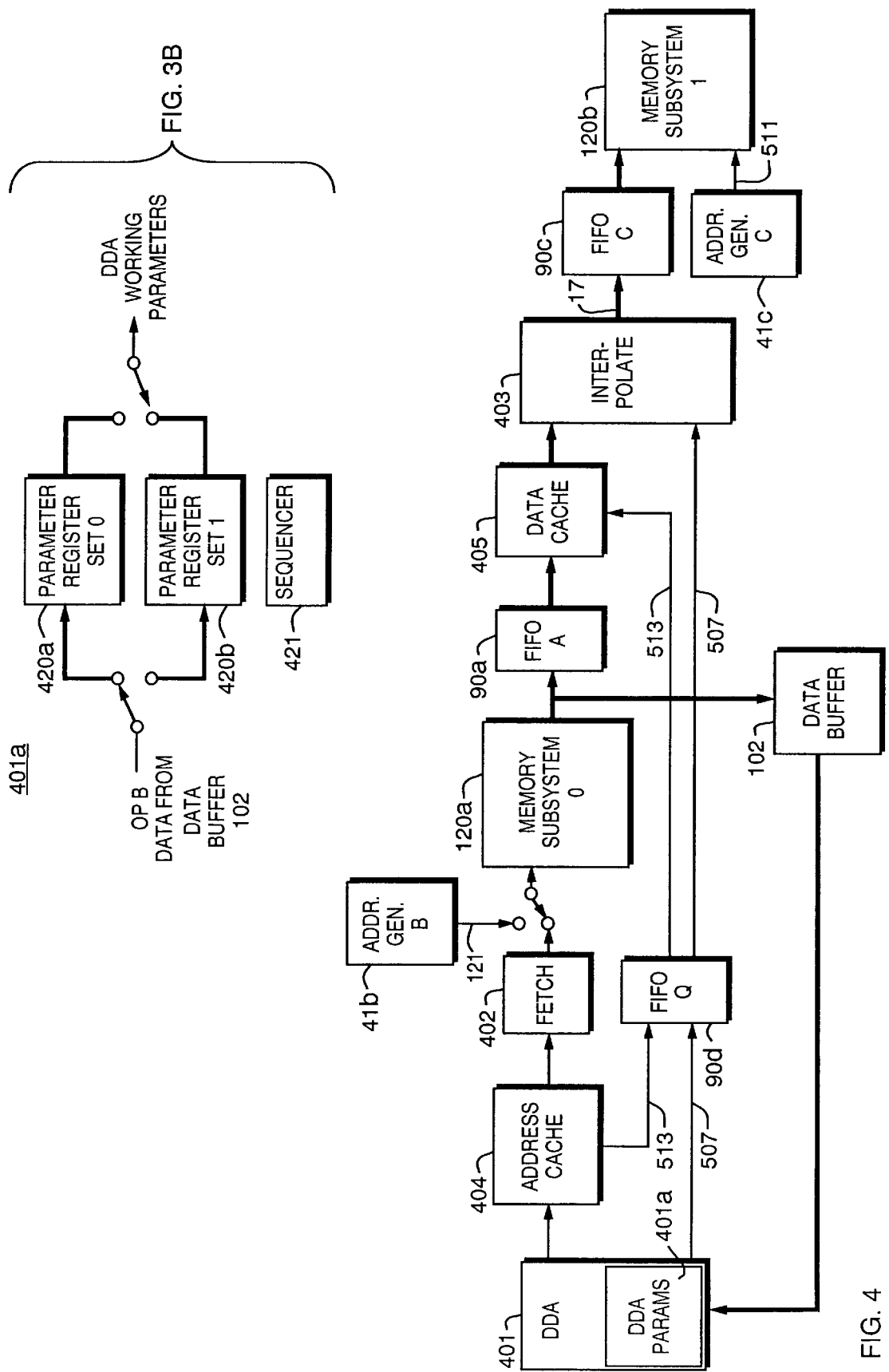

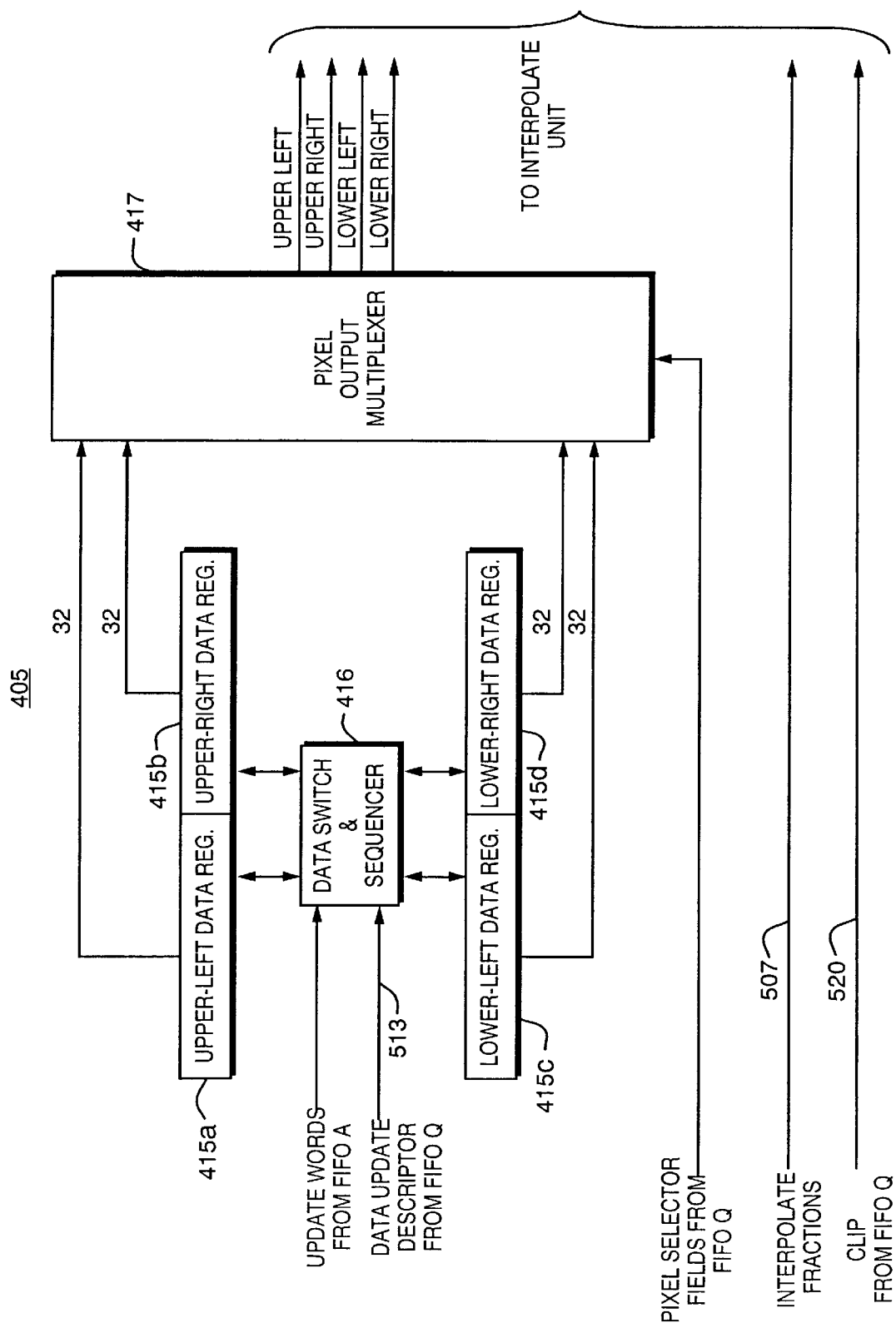

DATA RESAMPLER FOR DATA PROCESSING SYSTEM FOR LOGICALLY ADJACENT DATA SAMPLES

RELATED APPLICATION

This application is a Continuation-in-Part of commonly owned, co-pending, U.S. patent application Ser. No. 08/953,772 filed Oct. 17, 1997, which is fully incorporated herein by reference.

FIELD OF THE INVENTION

This invention relates to data processing systems and more particularly, to a data resampler and data resampling method for a data processing system for processing a stream of data containing logically adjacent or related data samples such as in a machine vision system.

BACKGROUND OF THE INVENTION

Machine vision systems (or other systems processing 2-dimensional data) often need to resample images to adjust scale, rotation, or other distortions in the original data prior to further processing. This operation is referred to herein as warping. For each point in the output image (rendered result array), several points in the source image are read and a computation performed to determine the value of the result. A well known computationally efficient technique uses bilinear interpolation for this purpose. This algorithm reads four neighboring samples surrounding the sub-sample location in the source image to be rendered (2×2 aperture). The hardware described is easily extended to higher-order interpolation kernel techniques which nonetheless fetch a fixed number of surrounding samples.

The location to be rendered may be determined by a number of well-known techniques. One technique suitable for efficient hardware implementation iteratively computes horizontal and vertical difference equations which cause the sampling point to move through the source image at successive sub-sample points. In the current embodiment, these difference equations compute a linear path. This is commonly known as a linear DDA (Digital Differential Analyzer). Various other techniques such as higher order DDAs or a data structure containing pre-computed sub-sample points to be rendered could also benefit from the techniques to be described.

Complex warping (e.g. mapping an annular ring to a rectangular image) using linear DDA hardware typically requires a large number of individual linear segments to be processed. Even a simple rotation requires a new DDA operation to be executed for each row of the output image. The need for the DDA hardware to be reinitialized frequently degrades the efficiency of operation.

A second problem occurs in the rendering process due to the nature of burst-mode memories (e.g. SDRAM, SGRAM). This is because all four neighboring pixels which must be fetched on each step do not generally lie on the same memory row. This can degrade performance as memory addressing repeatedly crosses (thrashes) memory row boundaries during the fetch process.

SUMMARY OF THE INVENTION

Accordingly, the current invention addresses the speed problem of the prior art by making a continuous stream of new parameters available to the DDA hardware.

The current invention uses three mechanisms to address the memory thrashing problem. First, address and data caches are employed for re-using pixels which may already have been fetched in a previous step. Second, the invention exploits SDRAM/SGRAM architecture by placing odd and even image rows in opposite internal banks and pre-activating the next bank address to anticipate the next row address required. Third, the FIFO technique described in co-pending patent application Ser. No. 08/953,772 is extended to mitigate the address to data latency of the burst-mode memories.

BRIEF DESCRIPTION OF THE FIGURES

FIGS. 1A and 1B are schematic diagrams which illustrate one example of a resampling process of the present invention;

FIG. 3B illustrates the double-buffering DDA parameter register circuit;

FIG. 4 is a block diagram showing the addition of address and data caches;

FIG. 7 is a block diagram which illustrates the operation of the data cache.

DETAILED DESCRIPTION OF THE PREFERRED EMBODIMENT

Figure 2:
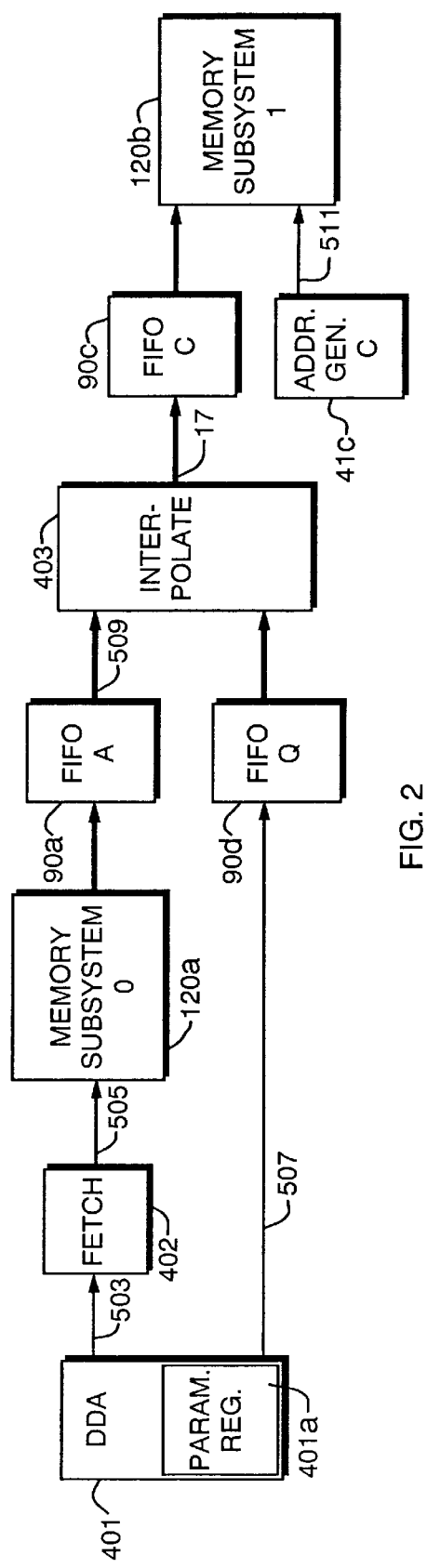
FIG. 2 is a simplified block diagram of the warper according to the present invention.

FIG. 1A is an overview of a resampling process according to the present invention. A 2-dimensional array of adjacent image data samples 701 is stored in memory. Typically these are taken directly from the data source. The resampling grid 702 represents points at which samples are to be rendered. For each point in the resampling grid 702, a result is generated (rendered) and stored in the 2-dimensional rendered output sample array 703. In the current embodiment, for computational efficiency, the resampling grid or array 702 consists of a series of straight line segments. These segments can piecewise approximate any type of warp distortion. Each rendering sequence involves moving along one of these lines at equally spaced, arbitrary sized steps. Thus, in the illustration, moving along the six resampling grid steps from A to B generates the seven rendered output values from A' though B'.

FIG. 1B details the process of rendering one of the linear segments (e.g. A to B). The initial sampling point 704 (e.g. A) is represented as an initial whole pixel address in the original sample array 701, and x and y sub-pixel offsets from that address. For each DDA step 705, a new sampling point is computed by adding the delta-x and delta-y steps to the present x-y position with full subpixel precision.

Each sampling location can be expressed as a pair of mixed fractions for X and Y. The integer parts representing pixel address and the fractional parts representing subpixel fractions. Interpolation is required except when the sampling location is exactly at an original sample point (both fractional parts are zero). Bilinear interpolation involves fetching the four pixels surrounding the sampling point. Note that movement in the Y direction involves the "stride" constant (the distance between the rows in the original sample array 701. The rendered output result is computed by considering all four neighboring pixels and the inverse distance of the sampling point from each of the four original samples.

The DDA unit 401, FIG. 2, generates a corner address and a set of interpolation coefficients for each sample to be rendered. For example, a linear DDA requires the following parameters which are loaded into working parameter registers 401a:

1. Source starting address.
2. Source starting X and Y fractions.
3. Delta-X and delta-Y (slope of the DDA to be generated)
4. Clipping bounds (to supply default value when valid source address range is exceeded).
5. Number of points to render.

In the simple exemplary implementation shown, these parameters are loaded into DDA unit registers prior to each operation.

The DDA unit 401 generates an interpolation corner address 503. The fetch unit 402 uses the generated interpolation corner address 503 to generate four source addresses 505 of samples to be fetched from the source array via memory subsystem 0 120a. The DDA unit 401 also generates a set of interpolation fractions 507 (x and y fractions) for each point to be rendered. Because of memory read latency (as described elsewhere herein), there is some delay before valid data is available. The interpolation fractions 507 are held in a first, first-in, first-out memory 90d (FIFO Q), permitting the DDA unit 401 and fetch unit 402 to continue to operate during the memory read latency period.

An interpolation unit 403 receives pixel data 509 from a second FIFO memory unit, FIFO A 90a and interpolation fractions 507 from FIFO Q 90d. The interpolation unit then computes the rendered result pixels, assembles them into memory words 17, and outputs the words to the destination memory subsystem 1 120b via a third FIFO memory unit, FIFO C 90c. The destination address 511 is supplied by address generator C 41c.

After each DDA rendering cycle, working parameter registers 401a must be reloaded. Host intervention would cause considerable overhead. Using the auto-sequencer (described in co-pending U.S. patent application No. 08/953,772 incorporated herein by reference) improves performance, but still requires flushing FIFO A 90a before and after each run and fetching auto-sequencer instructions and parameter sets from memory between runs. By pre-fetching large blocks of parameters into a data buffer 102 of FIG. 3A, most of this overhead is avoided.

Figure 3A:
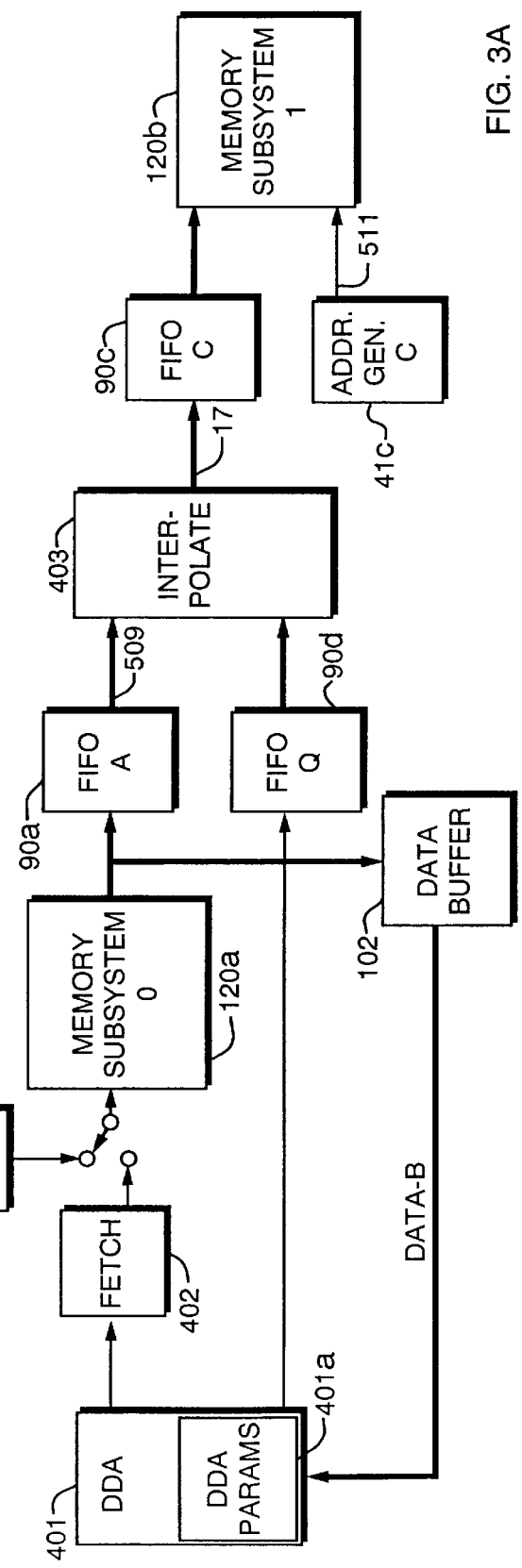
FIG. 3A is a block diagram illustrating the addition of a data buffer to hold DDA parameters.

In FIG. 3A, DDA parameter sets are located in memory 0 120a along with the source image, but in general, they may be located in either memory. Fetching parameter sets into the data buffer 102 is a separate operation, occurring whenever the data buffer 102 is empty. During this operation, memory/parameter addresses 121 are supplied by address generator B 41b. In FIG. 3A, a fourth FIFO memory unit which is part of data buffer 102, is also used to extend the capacity of the data buffer 102.

To further avoid overhead delays, parameter registers are double-buffered as shown in FIG. 3B. Two sets of registers 420a–420b are used. During a warping operation, one set of registers 420a/420b supplies the working values to the DDA circuit while the other is available to be loaded from data buffer 102 under control of sequencer 421. In this way, no parameter loading delay need be encountered when one DDA run terminates and another starts.

To make more efficient use of memory bandwidth during the rendering operation, an address cache 404 and a data cache 405 are added as shown in FIG. 4. The width of FIFO Q 90d is also increased to carry a data descriptor 513 along with each set of interpolation fractions 507.

In the current embodiment, the data cache 405 consists of two cache lines (register sets) each holding two four (4) pixel memory words 17. The contents of the data cache registers represent an 8×2 pixel neighborhood. The address cache 404 has two cache lines comprising upper and lower cache lines. Each cache line is comprised of two address registers. Each address register, when valid, holds the address of a word in source memory 120a. Data from the two words thus pointed to eventually become the contents of the corresponding data cache 405 cache line. Although the present invention is described in connection with four (4) pixel words per memory word, this is not a limitation of the present invention as it also applies to wider or narrower memory words as will be appreciated by those skilled in the art.

Address cache 404 computes the four required addresses based on the incoming DDA corner address. It then compares these with all valid addresses currently resident in the address cache 404 and determines if any new data needs to be fetched from memory. It then instructs the fetch unit 402 to supply the required addresses to the source memory subsystem 120a. At the same time, it encodes and outputs a data descriptor 513 containing instructions for the data cache unit 405. The data descriptor specifies how the data cache 405 is to update it's registers from FIFO A 90a if required, and how to form the required interpolation neighborhood once it's registers contain valid data.

In the current embodiment, two memory words are always fetched whenever a cache line is re-filled, exploiting the efficient burst mode capability of SDRAM/SGRAM. The data descriptor 513 can also instruct the data cache 405 to load the upper cache line from the lower cache line or vice versa. Note also that the address cache 404 can reload the upper from the lower address cache line or vice versa as the addresses are processed.

Once the data cache 405 contains valid data, the required four pixels are supplied to the interpolation unit 403 using information from the data descriptor 513, along with the interpolation fractions 507 from FIFO Q 90d.

Figure 5:
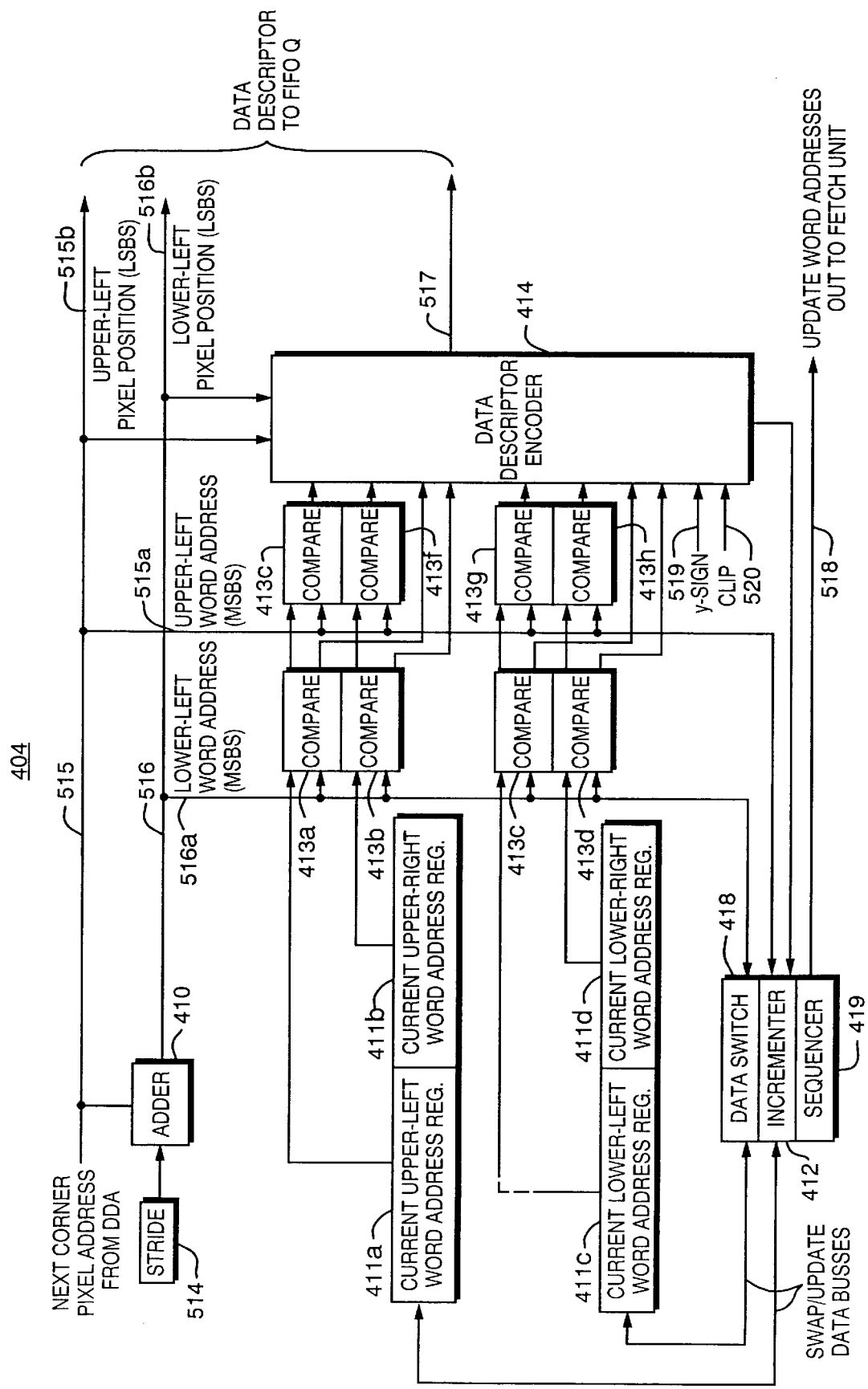
FIG. 5 is a schematic diagram showing the operation of the address cache feature of the present invention.

The operation of the address cache 404 is detailed in FIG. 5. The lower-left pixel address 516 is generated by adding the stride 514 to the corner pixel (upper-left) address 515 using adder 410. The msb's of these addresses represent a memory address containing the desired pixel. In the present example, there are four pixels in each memory word 17, and there are 26 bits of pixel address corresponding to 24 bits of memory address 515a and 516a and 2 bits of pixel position 515b and 516b within the memory word.

Figure 6:
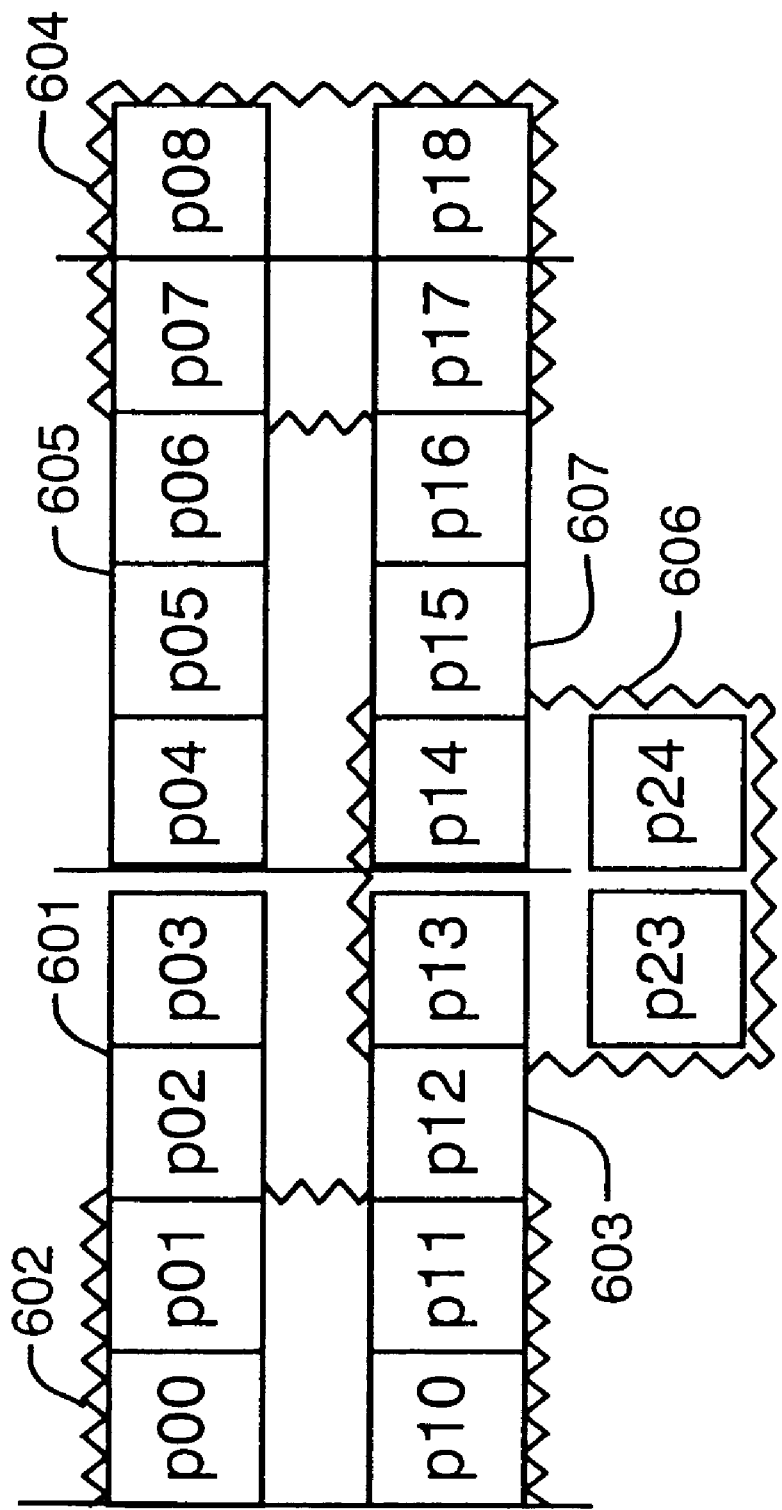
FIG. 6 is a schematic diagram which illustrates some examples of cache operation.

There are four working address registers 411a–411d organized as two address cache lines. The first line comprises registers 411a and 411b. The second cache line includes registers 411c and 411d. In each line, one register (for example the left registers) 411a and 411c holds the address of the memory word containing the left pixel, while one register (for example the right registers) 411b and 411d holds the address of the next word. This means that both the left and right pixels are contained within the two words pointed to by the left and right address registers. This is illustrated by the examples in FIG. 6.

The four memory locations addressed hold the pixel values shown. The p00 2×2 neighborhood 602 lies entirely within the cache. When the p07 neighborhood 604 is to be processed both cache lines must be updated. In the current embodiment, four new memory words are fetched in this case. Note that words 01 605 and 11, 607 could have been reused. This was not deemed necessary due to the high SDRAM/SGRAM burst bandwidth. When the p13 neighborhood 606 is to be processed, the lower cache line (words 10, 603 and 11, 607), are transferred to the upper cache line (words 00, 601 and 01 605), and the lower registers 411c and 411d are updated from the incoming lower-left word address 516a. Whenever a cache line is updated, the incrementer 412 generates the right address or addresses.

On the start of a warp operation, all four working registers' contents are invalid until loaded on the first address step. The memory addresses 515a and 516a of the upper-left 515 and lower-left 516 pixels are compared with all four working address registers 411a–411d contents when valid, using comparators 413a–413h. The results of these comparisons, plus the location of the pixel within the word, determine the actions required to update the address and data caches. Data descriptor encoder 414 generates a data cache update descriptor 517, which enters FIFO Q (90d of FIG. 3A) along with the pixel location bits 515b and 516b as data descriptor 513, along with the interpolation fractions 507. The encoder 414 also instructs the incrementer 412 to update the address cache working registers 411a–411d using data switch 418 and sequencer 419. The sequencer 417 also requests words to be fetched from memory via the fetch unit 402, via a fetch signal 518.

The data descriptor 517 includes the sign of the vertical DDA (y-sign) 519, FIG. 5. This determines the order in which the fetch unit will request and the data cache will receive data from the upper and lower memory rows. The y-sign 519 also instructs the source memory controller (40 in FIG. 5 of co-pending U.S. patent application 08/953,772) to precharge the alternate SDRAM/SGRAM alternate bank on the previous row address rather than the next row address when asserted. This strategy reduces memory latency whenever a cache line update occurs. The encoder 414 also receives a clip input signal 520 from the DDA unit 401. When this is asserted, the DDA unit has determined that at least one source address is invalid. In this case, no data is fetched and the data cache forwards the signal to the interpolate unit 403 which outputs a default value to the result-C bus 17 for the corresponding pixel.

The data cache 405, FIG. 7, has four (4) working registers 415a–415d each holding a memory word. Pairs of registers, 415a/415b and 415c/415d left and right, each comprise a data cache line holding eight pixels. The data switch and sequencer 416 updates working registers 415a–415d based on the data descriptor 513 from the output of FIFO Q 90d. When working register update is required, data is taken from FIFO A 90a. The data switch 416 can also move data between the upper and lower cache lines when required. The data descriptor 513 insures that the sequence of updates corresponds to the sequence of addresses issued to the source data memory subsystem 120a.

Pixel output multiplexer 417 selects the four pixels forming the required 2×2 neighborhood for interpolation using the corresponding FIFO Q pixel select fields. The corresponding interpolation fractions 507 from the FIFO Q are passed directly to the interpolation unit 403 which forms four coefficients based on the interpolation fractions; multiplies each by the corresponding pixel value to provide four products; sums the four products; and normalizes the result, producing the rendered pixel value. When clip 520 from the DDA 401 is asserted, the interpolation unit outputs a default value. The rendered pixel output values are packed into a memory word and output to the destination bus. In the current embodiment, four pixels are rendered for each memory word written out.

Accordingly, the present invention provides a novel data resampler for processing logically adjacent data samples.

Modifications and substitutions by one of ordinary skill in the art are considered to be within the scope of the present invention which is not to be limited except by the claims which follow.

What is claimed is:

1. A data resampler for a data processing system processing logically adjacent data samples, said data sampler comprising:
    a memory subsystem, for storing at least a first plurality of data samples to be rendered;
    a digital differential analyzer (DDA), responsive to DDA parameter sets, for generating an interpolation corner address for said plurality of data samples to be rendered, and for also generating a set of interpolation fractions;
    a fetch unit, for receiving the generated interpolation corner address and for generating four source addresses of data samples to be fetched from said memory subsystem;
    a first FIFO memory, for holding said interpolation fractions and for permitting said DDA and fetch unit to continue to operate during memory read latency periods;
    a second FIFO memory, for holding pixel data;
    a first address generator;
    an address cache and a data cache, wherein said data cache comprises at least two cache lines each holding two memory words and wherein said address cache comprises at least two cache lines each comprised of two address registers, each address register for holding an address of a word in said memory subsystem; and
    an interpolation unit, for receiving pixel data from said second FIFO memory and interpolation fractions from said first FIFO memory, for computing rendered result pixels, for assembling said result pixels into memory words, and for outputting said memory words to a destination memory address supplied by said address generator in a destination memory subsystem via a third FIFO.

2. The data resampler as claimed in claim 1 further including:
    a data buffer, for holding DDA parameter sets in DDA parameter registers, said DDA parameter sets fetched from said memory subsystem whenever said data buffer is empty; and
    a second address generator, for supplying memory subsystem addresses to said memory subsystem for DDA parameter sets to be retrieved from said memory subsystem.

3. The data resampler as claimed in claim 1, further including a fourth FIFO to extend the capacity of said data buffer, and wherein said DDA parameter registers are double-buffered and comprise two sets of registers, a first set of which supplies working values to said DDA and a second set of which is available to be loaded from said fourth FIFO under control of a sequencer in order to eliminate parameter loading delay.

4. The data resampler as claimed in claim 1, wherein the width of said first FIFO is increased to carry a data descriptor along with each set of interpolation fractions.

5. The data resampler as claimed in claim 1 further comprising an adder for generating a lower-left pixel address from an upper-left pixel address by adding a stride to said upper-left pixel address.

6. The data resampler as claimed in claim 1 further comprising four working address registers organized as two address cache lines each having left and right registers for holding addresses of memory words, wherein in each line the left register holds the address of the memory word containing the left pixel, and the right register holds the address of the next word.

7. The data resampler as claimed in claim 6 further comprising an incrementer for generating correct memory addresses whenever a cache line is updated.

8. The data resampler as claimed in claim 7 further comprising at least one comparator for comparing the memory addresses of the upper-left and lower-left pixels with the contents of all four working address registers.

9. The data resampler as claimed in claim 8, further comprising a data descriptor encoder and a data switch and sequencer, said descriptor encoder for generating a data cache update descriptor and for instructing said data switch and sequencer to update the address cache working registers and to request words to be fetched from memory via said fetch unit.

10. The data resampler as claimed in claim 1, wherein said data cache comprises four working registers each holding a memory word, said registers arranged in left and right pairs, each pair comprising a data cache line holding twice the number of pixels per memory word.

11. The data resampler as claimed in claim 10, further including a second data switch and sequencer, which updates working registers based on the data descriptor from the output of said first FIFO and a pixel output multiplexer.

12. A method of resampling data for a data processing system for logically adjacent data samples, said method comprising:

storing at least data samples to be rendered in a memory subsystem;

generating, in response to digital differential analyzer (DDA) parameter sets stored in DDA parameter set registers, an interpolation corner address for a sample to be rendered and a set of interpolation fractions using a digital differential analyzer (DDA);

receiving the generated interpolation corner address and responsive to said received interpolation corner address, generating four source addresses of samples to be fetched from said memory subsystem using an address cache;

comparing said four source addresses with all addresses resident in four working address registers of said address cache;

determining if any new address needs to be fetched from said memory subsystem and fetching any required address from said memory subsystem;

holding said interpolation fractions in a FIFO memory to permit said DDA to continue to operate during memory read latency periods;

holding pixel data in a second FIFO; and receiving pixel data from said second FIFO and interpolation fractions from said first FIFO and computing rendered result pixels, assembling said result pixels into memory words, outputting said words to a destination memory address supplied by an address generator in a destination memory subsystem via a third FIFO, and reloading DDA parameter set registers after each DDA rendering cycle.

13. The method of resampling data as claimed in claim 12, further comprising pre-fetching blocks of parameters into a data buffer.

14. The method of resampling data as claimed in claim 13 further comprising double-buffering said parameter registers into two sets of registers, a first register set of said two sets of registers of which supplies working values to said DDA, and a second register set of which is available to be loaded from said fourth FIFO under control of a sequencer in order to eliminate parameter loading delay.

15. The method of resampling data as claimed in claim 14 further comprising providing a data cache having two cache lines and holding two memory words in each of said cache lines.

16. The method of resampling data as claimed in claim 12 further comprising encoding and outputting a data descriptor, which specifies how the data cache is to update it's registers from said second FIFO.

17. The method of resampling data as claimed in claim 16, further comprising fetching two memory words whenever a cache line is re-filled.

18. The method of resampling data as claimed in claim 17, wherein said data descriptor also instructs said data cache to load the upper cache line from the lower cache line.

19. The method of resampling data as claimed in claim 17, wherein said data descriptor also instructs said data cache to load the lower cache line from the upper cache line.

20. The method of resampling data as claimed in claim 12, wherein a lower-left pixel address is generated by adding the stride to the upper-left (corner) pixel address using an adder.

21. The method of resampling data as claimed in claim 12, further comprising organizing the four working address registers as two address cache lines each containing left and right address registers holding the address of the memory word containing the left pixel in the left register and holding the address of the next word in the right address register.

22. The method of resampling data as claimed in claim 21, further comprising generating correct memory addresses whenever a cache line is updated using an incrementer.

23. The method of resampling data as claimed in claim 22, further comprising comparing the memory address of the upper-left and lower-left pixels with the contents of all four working address registers.

24. The method of resampling data as claimed in claim 23, further comprising generating a data cache update descriptor and instructing a data switch and sequencer to update the address cache working registers and requesting words to be fetched from memory.

* * * * *